United States Patent
Hyun

(10) Patent No.: US 10,004,215 B2
(45) Date of Patent: Jun. 26, 2018

(54) FISHING REEL EQUIPPED WITH ANTI-LOOSENING HANDLE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days. days.

(21) Appl. No.: 15/435,443

(22) Filed: Feb. 17, 2017

(65) Prior Publication Data

US 2017/0238515 A1    Aug. 24, 2017

(30) Foreign Application Priority Data

Feb. 24, 2016  (KR) .................. 10-2016-0021850

(51) Int. Cl.
*A01K 89/01*     (2006.01)
*A01K 89/015*    (2006.01)

(52) U.S. Cl.
CPC .................. *A01K 89/01905* (2015.05)

(58) Field of Classification Search
CPC ............... A01K 89/006; A01K 89/015; A01K 89/0183; F16B 33/02; F16B 37/14; F16B 39/08
See application file for complete search history.

(56) References Cited

U.S. PATENT DOCUMENTS

| | | | | | |
|---|---|---|---|---|---|
| 4,524,921 | A * | 6/1985 | Ozaki | .................. | A01K 89/006 242/284 |
| 5,402,953 | A * | 4/1995 | Sato | ..................... | A01K 89/015 242/321 |
| 5,683,050 | A * | 11/1997 | Murayama | ........... | A01K 89/006 242/283 |
| 6,464,158 | B1 * | 10/2002 | Sakurai | ................ | A01K 89/006 242/283 |
| 8,840,053 | B2 * | 9/2014 | Takechi | ............... | A01K 89/006 242/282 |
| 2003/0205637 | A1 * | 11/2003 | Nakajima | ............ | A01K 89/006 242/283 |
| 2009/0136316 | A1 * | 5/2009 | Seiter | .................... | F16B 33/002 411/204 |
| 2011/0262245 | A1 * | 10/2011 | Michiwaki | ............ | F16B 33/006 411/412 |

(Continued)

FOREIGN PATENT DOCUMENTS

KR    19910017091    11/1991
KR    20050001347    1/2005

(Continued)

*Primary Examiner* — Emmanuel M Marcelo
(74) *Attorney, Agent, or Firm* — Cantor Colburn LLP

(57) ABSTRACT

Provided is a fishing reel equipped with an anti-loosening handle. The fishing reel includes an anti-loosening plug that is fitted on first flat portions of a handle shaft and has sub-male threaded portions corresponding to first male threaded portions in order to solve a problem that a handle nut is loosened or a handle shaft is broken when a load is applied to a handle arm in a process of winding a fishing line due to a gap between the handle nut and a flat portion of a handle shaft even though the handle nut is fixed in common handle shafts having an anti-idling flat portion at an end which is formed by U-cutting or side-cutting to couple the handle arm without idling.

4 Claims, 10 Drawing Sheets

(56) References Cited

U.S. PATENT DOCUMENTS

2014/0151484 A1\* 6/2014 Header ................ A01K 89/016
                                                                242/295
2014/0319264 A1\* 10/2014 Ikuta .................... A01K 89/006
                                                                242/395

FOREIGN PATENT DOCUMENTS

| KR | 2020140006208 | 12/2014 |
| KR | 20150089623 | 8/2015 |
| KR | 20150115411 | 10/2015 |
| KR | 20150135990 | 12/2015 |

\* cited by examiner

FISHING REEL EQUIPPED WITH ANTI-LOOSENING HANDLE

BACKGROUND OF THE INVENTION

Field of the Invention

The present invention relates to a fishing reel equipped with an anti-loosening handle.

In detail, the present invention relates to a fishing reel equipped with an anti-loosening handle, the fishing reel including an anti-loosening plug that is fitted on first flat portions of a handle shaft and has sub-male threaded portions corresponding to first male threaded portions in order to solve a problem that a handle nut is loosened or a handle shaft is broken when a load is applied to a handle arm in a process of winding a fishing line due to a gap between the handle nut and a flat portion of a handle shaft even though the handle nut is fixed in common handle shafts having an anti-idling flat portion at an end which is formed by U-cutting or side-cutting to couple and prevent the handle arm from idling.

Description of the Related Art

A structure of a handle including a handle shaft of a fishing reel in the related art is shown in FIG. 1 in Korean Patent Application Publication No. 10-2015-0089623 (published on 5 Aug. 2015, titled "Fishing reel equipped with drag assembly") by the applicant(s).

This structure is little different from the structure shown in FIG. 2 in this specification except for a plug HP.

A common anti-loosening structure composed of a bolt and a nut may be exemplified as a fastening structure for supplementing and reinforcing a handle shaft and a handle nut of the handle of the fishing reel of the present invention.

In relation to the anti-loosening structure of the related art, there is Korean Patent Application Publication No. 10-2015-0135990 (published on 4 Dec. 2015, titled "Loosing prevention bolt assembly")

The loosening prevention bolt assembly can be easily machined and can provide a stable loosening prevention effect for a long period of time.

The assembly includes a loosing prevention threaded portion that is inserted in a coupling groove of a nut and tightened on a bolt to lock the bolt and the nut. The bolt has a wedge groove recessed by a predetermined depth in the axial direction and the loosening prevention threaded portion has a wedge that has a lower portion having a shape corresponding to the shape of the wedge groove and is locked in the wedge groove through the coupling groove.

Further, there is Korean Utility Model Application Publication No. 20-2014-0006208 (published on 10 Dec. 2014, titled "Anti-loose nut set), which proposes an anti-loosening nut that improves the ability of anti-loosening using an elastic member and has a structure that can be simply manufactured at a low cost.

Further, a "Bolt loose stopper structure" has been disclosed in Korean Patent Application Publication No. 10-2015-0115411 (published on 14 Oct. 2015).

The bolt loose stopper structure can apply optimum torque without unnecessarily additionally tightening or loosening a bolt that has been tightened.

The bolt loosening stopper structure includes: a bolt that has a head at an end formed so that the bolt can be used with the position of a stopping cap simply changed and fixed to more firmly fix the bolt; an external projection formed on a side of the head of the bolt; a coupling groove formed around the head of the bolt; and a stopper cap that has an insertion groove to cover the head of the bolt when being inserted in the coupling groove and has an odd number of internal projections formed on the inner side of the insertion groove to stop rotation of the external protrusion.

However, according to the related art including these three structures for preventing bolts and nuts from loosening, bolts and nuts are additionally tightened or tension is applied.

Accordingly, those are technologies not related to a structure for preventing loosening of nuts and bolts and reinforcing bolts and nuts that have anti-idling flat portions formed by U-cutting or side-cutting.

SUMMARY OF THE INVENTION

An object of the present invention is to provide a fishing reel equipped with an anti-loosening handle, the fishing reel including an anti-loosening plug that is fitted on first flat portions of a handle shaft and has sub-male threaded portions corresponding to first male threaded portions in order to solve a problem that a handle nut is loosened or a handle shaft is broken when a load is applied to a handle arm in a process of winding a fishing line due to a gap between the handle nut and a flat portion of a handle shaft even though the handle nut is fixed in common handle shafts having an anti-idling flat portion formed by U-cutting or side-cutting at an end to couple and prevent the handle arm from idling.

Another object of the present invention is to provide a fishing reel equipped with an anti-loosening handle in which flat portions of a handle shaft are symmetrically formed on both sides of an end portion of the handle shaft and have a U-shaped cross-section and a plug has filler portions formed at both sides and having a sub-threaded portion and a bridge connecting the filler portions to fill gaps, thereby preventing vibration and loosening and providing convenience in assembly.

Another object of the present invention is to provide a fishing reel equipped with an anti-loosening handle that provides convenient explosion for assembly and maintenance and convenient reassembly by providing a positioning mechanism, particularly, a positioning mechanism composed of male and female coupling portions between a plug and a handle shaft.

In order to achieve the objects of the present invention, there is provided a fishing reel including: a frame; a spool combined with the frame through a spool shaft; a handle coupled to a side of the frame through a handle shaft to rotate the spool; and a tension nut disposed on a side of the frame to adjust a casting distance by controlling a rotational speed of a spool shaft, in which the handle includes: a handle shaft operating with the spool and having first male-threaded portions at an end thereof, anti-idling first flat portions formed at sides of the first male threaded portions, and stoppers formed at lower ends of the first flat portions; a handle arm having a coupling hole fitted on the first male threaded portions having a non-circular structure for preventing idling due to the first flat portions, to be seated on the stoppers; handle knobs disposed at ends of the handle arm; an anti-loosening plug fitted on the first flat portions of the handle shaft and having sub-male threaded portions corresponding to the first male threaded portions; and a handle nut thread-fastened to a coupling male threaded portion formed by the first male threaded portions and the sub-male threaded portions and fixing the handle arm locked to the stoppers.

In the fishing reel, first flat portions of the handle shaft may be symmetrically formed on both sides of an end portion of the handle shaft and have a U-shaped cross-section, and the plug may have filler portions formed at both sides and having the sub-male threaded portion and a bridge connecting the filler portions.

Further, a positioning mechanism may be disposed between the plug and the handle shaft, in which the positioning mechanism may be a first male-female coupling mechanism formed in a longitudinal direction of the handle shaft or a second male-female coupling mechanism formed across the longitudinal direction.

According to the present invention, there is provided a fishing reel equipped with an anti-loosening handle, the fishing reel including an anti-loosening plug that is fitted on first flat portions of a handle shaft and has sub-male threaded portions corresponding to first male threaded portions, so it is possible to solve a problem that a handle nut is loosened or a handle shaft is broken when a load is applied to a handle arm in a process of winding a fishing line due to a gap between the handle nut and a flat portion of a handle shaft even though the handle nut is fixed in common handle shafts having an anti-idling flat portion at an end which is formed by U-cutting or side-cutting to couple and prevent the handle arm from idling. Further, according to the present invention, flat portions of a handle shaft are symmetrically formed on both sides of an end portion of the handle shaft and have a U-shaped cross-section and a plug has filler portions formed at both sides and having a sub-threaded portion and a bridge connecting the filler portions to fill gaps, so it is possible to prevent vibration and loosening and provide convenience in assembly. Further, a positioning mechanism, particularly, a positioning mechanism composed of male and female coupling portions is disposed between a plug and a handle shaft, thereby providing convenient explosion for assembly and maintenance and convenient reassembly.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
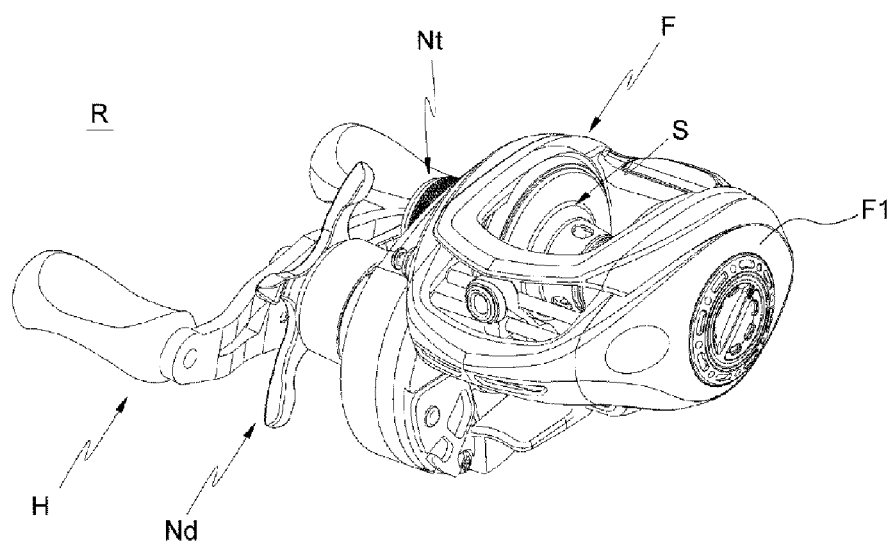
FIGS. 1A and 1B are views showing a fishing reel that is equipped with an anti-loosening handle according to the present invention.

The present invention is described hereafter in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

In the following description, when it is determined that well-known function and configuration may unnecessarily make the spirit of the present invention unclear, they will not be described.

Figure 1B:
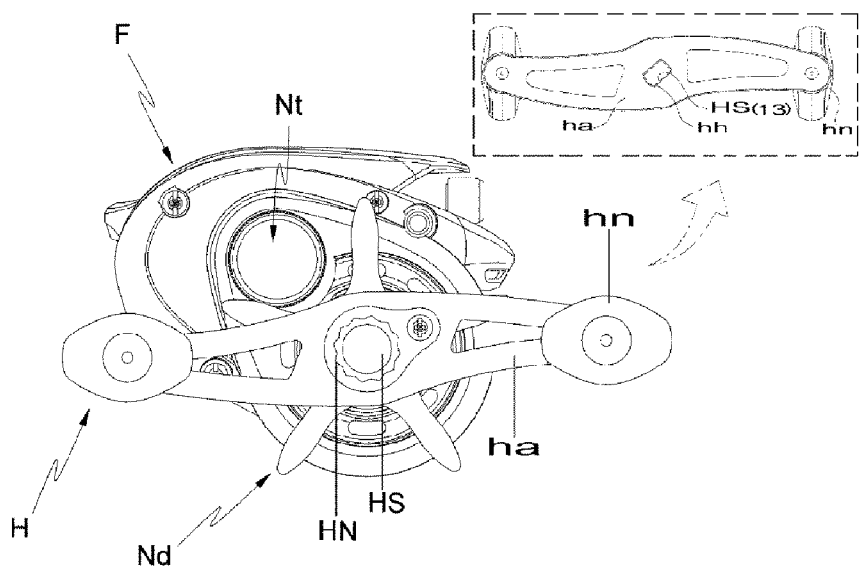

Terms such as 'a first ~' and 'a second ~' are used only for the purpose for distinguishing a constitutive element from other constitutive element, but constitutive element should not be limited to a manufacturing order, and the terms described in the detailed description of the invention may not be consistent with those described in the claims First, as shown in FIGS. 1A and 1B, a common fishing reel R includes a frame F, a spool S combined with the frame through a spool shaft, a handle H coupled to a side of the frame through a handle shaft to rotate the spool, and a tension nut Nt disposed on a side of the frame to adjust the casting distance by controlling the rotational speed of a spool shaft HS.

Further, a star drag nut Nd for adjusting 'drag power' for protecting the fishing line by reducing the speed of the fishing line unwinding from the spool when a fish swims away with the fishhook is disposed on the spool shaft HS.

Figure 2A:
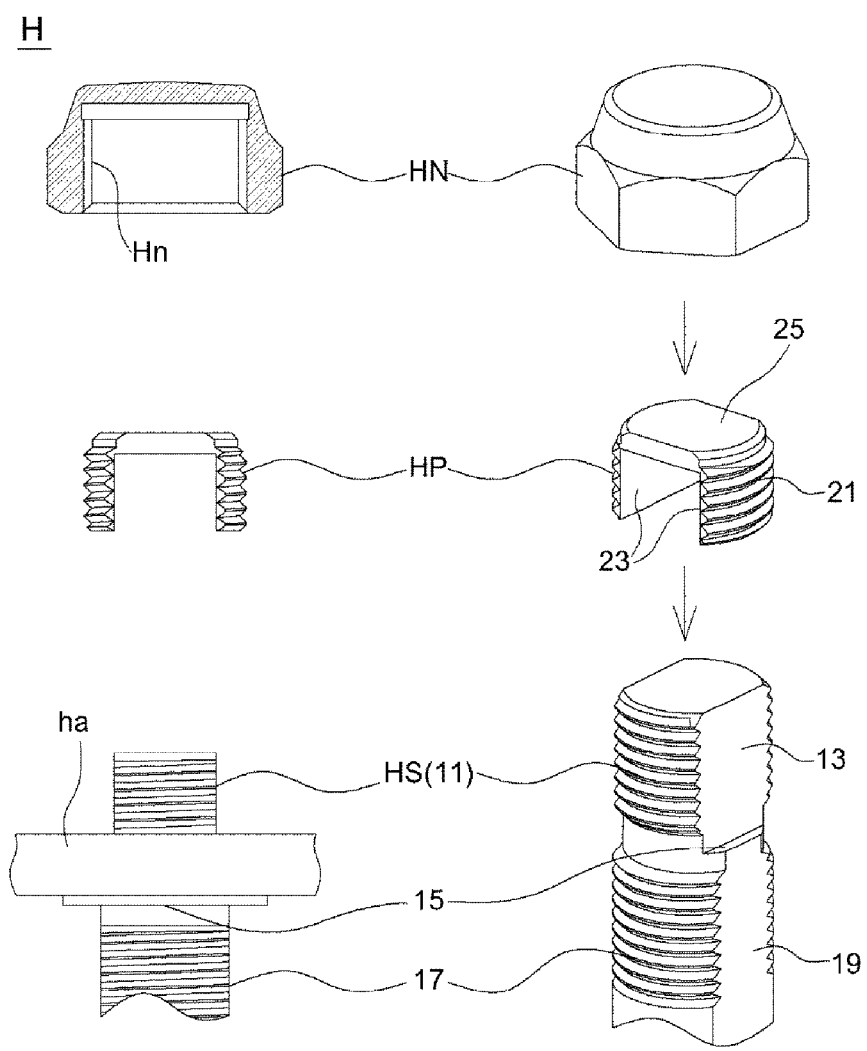
FIGS. 2A, 2B, 3A, 3B, 4A, 4B, 5A and 5B are views showing various embodiments of an anti-loosening handle according to the present invention.
Figure 2B:
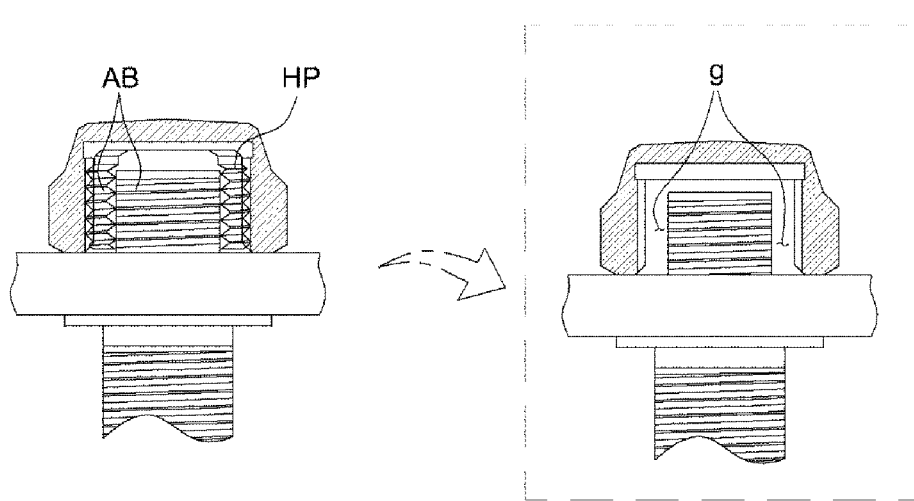

In the fishing reel, particularly, in the bate reel R, as can be seen from FIGS. 1A and 1B, the dotted block at the right side in FIG. 1B, and FIGS. 2A and 2B, the handle H is composed of a handle shaft HS, a handle arm ha, handle knobs hn, and a handle nut HN.

The handle shaft HS is operated with the spool S and has first male-threaded portions 11 at an end portion thereof, anti-idling first flat portions 13 formed at sides of the first male threaded portions, and stoppers 15 formed at the lower ends of the first flat portions.

The handle arm ha has a coupling hole hh (see FIG. 1B) fitted on the first male threaded portions 11, which has a non-circular structure for preventing idling due to the first flat portions 13, to be seated on the stoppers 15.

The handle nut HN is thread-fastened to the first male threaded portions 11 (to a coupling male threaded portion AB formed by sub-male threaded portions 21 and the first male threaded portions when a plug HP is provided) and fixes the handle arm ha locked to the stoppers 15.

The handle knobs hn are disposed at ends, particularly, both ends of the handle arm ha.

The handle shaft HS further has second male threaded portions 17 under the stoppers 15 formed like a step for locking and the star drag nut Nd for adjusting 'drag power' is thread-fastened to the second male threaded portions 17 to adjust drag power by being tightened and loosened.

Second flat portions 19 are formed at sides of the second male threaded portions 17 to fit various washers thereon for assisting the operation of the star drag nut Nd.

The first and second flat portions 13 and 19 of the handle shaft HS are each symmetrically formed particularly on both sides of end portions with a U-shaped cross section, but may be formed in other various non-circular structures to prevent idling.

As shown in the dotted block at the right side in FIG. 1B, when the handle nut HN having female threaded portions Hn corresponding to the first male threaded portions 11 at the first flat portions of the handle shaft HS is combined, gaps g are necessarily formed between the handle nut HN and the first flat portions 13 of the handle shaft.

When a load is applied to the handle arm ha for example in the process of winding the fishing line, vibration is necessarily caused by the gaps g, so the handle nut HN may be loosened or a portion of the handle shaft HS where stress is concentrated may be broken due to accumulation of repeated fatigue.

Accordingly, the preset invention has been made to achieve an anti-loosening handle H by providing the anti-loosening plug HP fitted on the first flat portions 13 of the handle shaft HS and having the sub-male threaded portions 21 corresponding to the first male threaded portions 11 and the female threaded portion Hn of the handle nut HN.

In particular, the plug HP that is the key component of the present invention has filler portions 23 formed at both sides and having the sub-male threaded portions 21, respectively, to be fitted to the shape of the first flat portions 13 having a U-shaped cross-section and a bridge 25 connecting the filler portions.

In detail, the plug is provided to fill the gaps g between the first flat portions 13 of the handle shaft HS and the handle nut HN and provide the coupling threaded portion AB (see FIG. 2B) foiled by the first threaded portions 11 and the sub-male threaded portions 21 to be thread-fastened to the female threaded portion Hn of the handle nut HN.

The structure that prevents vibration and loosening by providing a plug and can be easily assembled can be seen from the exploded front view at the right side and the exploded perspective view at the right side in FIG. 2A and the assembly and cross-sectional views in FIG. 2B.

The anti-loosening handle H having the anti-loosening plug according to the present invention can be modified to be applied to a spinning reel that is suitable for casting a lure to a long distance, not stronger than a bate reel though, and can exactly locate light lures to desired points.

The handle H and the reel R according to the present invention can be more conveniently exploded for assembly and maintenance and then reassembled using a positioning mechanism between the plug and the handle shaft.

In detail, the positioning mechanism may be first male-female coupling mechanisms J1, J1m, j1, and j1m that are formed in the longitudinal direction of the handle shaft, as shown in FIGS. 3A, 3B, 4A and 4B.

Figure 5A:
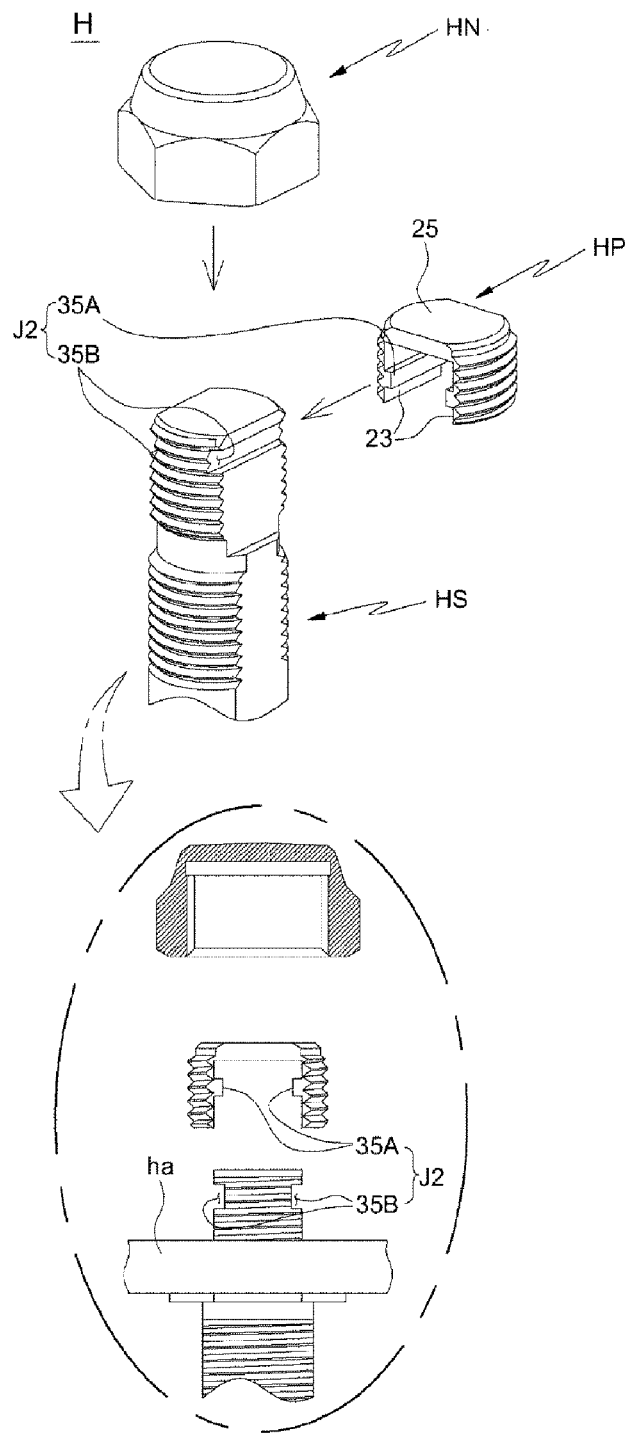
Figure 5B:
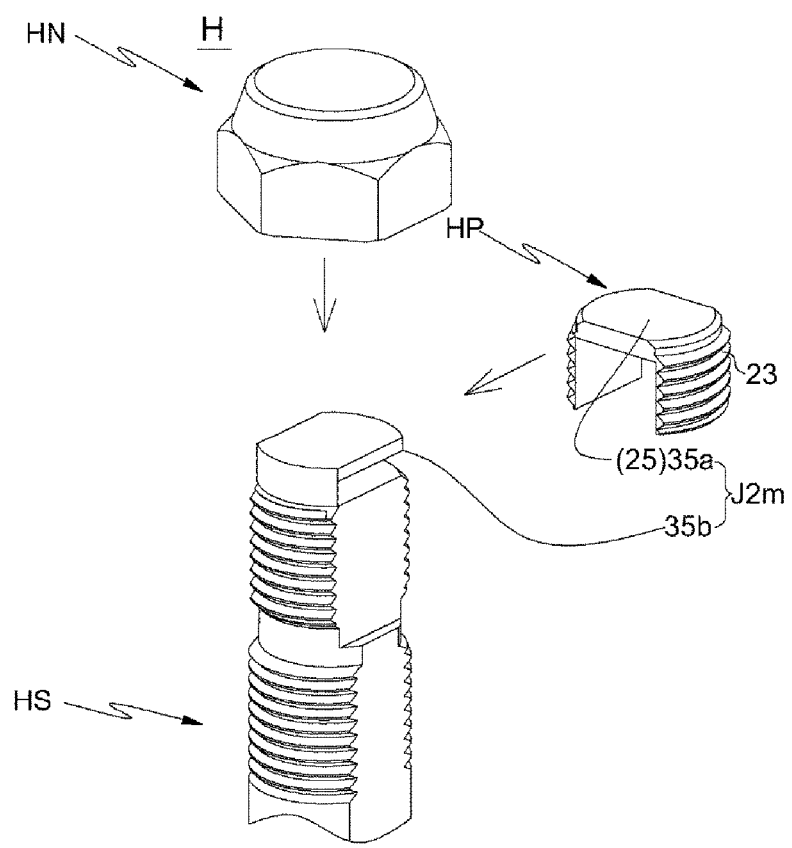

Further, as shown in FIGS. 5A and 5B, the positioning mechanism may be second male-female coupling mechanism J2 and J2m formed across the longitudinal direction of the handle shaft.

Figure 3A:
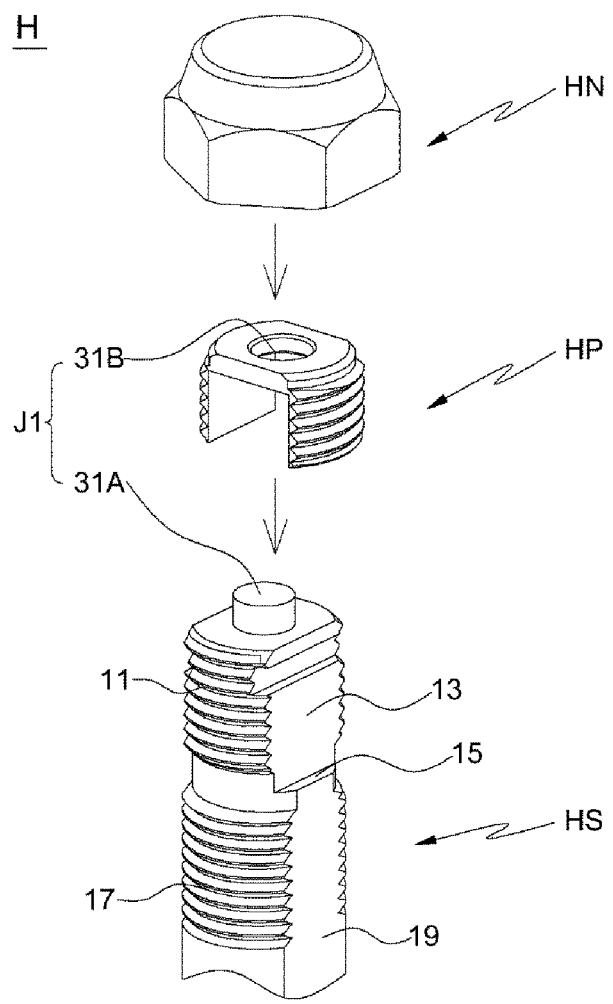

The first male-female coupling mechanism J1 shown in FIG. 3A is composed of a male portion 31A protruding from the top of the handle shaft HS and a female portion 31b that is a hole formed through the bridge 25 of the plug HP such that the bridge is fitted on the male portion through the female portion and then the handle nut HN is thread-fastened to the coupling male threaded portion.

Figure 3B:
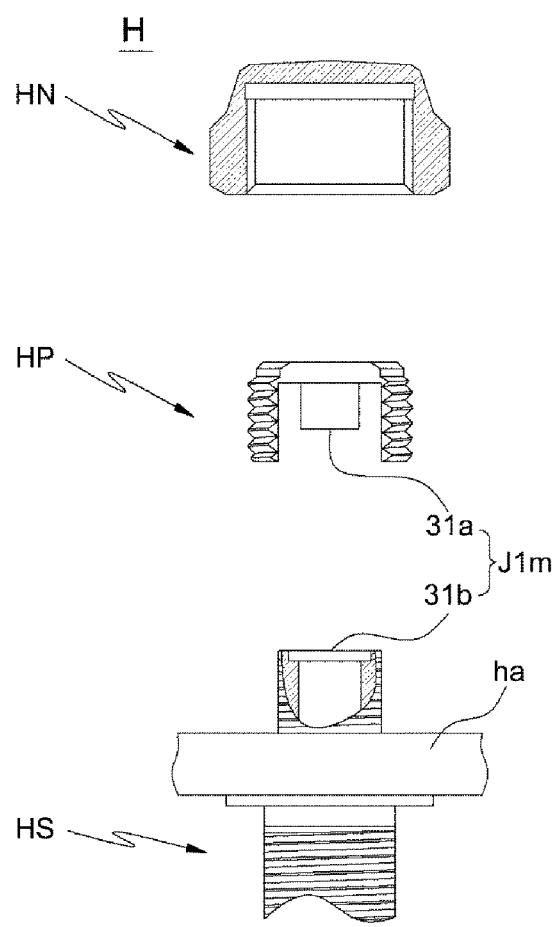

On the other hand, the first male-female coupling mechanism J1m shown in FIG. 3B is composed of a female portion 31b that is a groove formed on the top of the handle shaft HS and a male portion 31a protruding from the bottom of the bridge 25 of the plug HP such that the male portion on the bridge is fitted in the female portion of the handle shaft and then the handle nut HN is thread-fastened to the coupling male threaded portion.

Figure 4A:
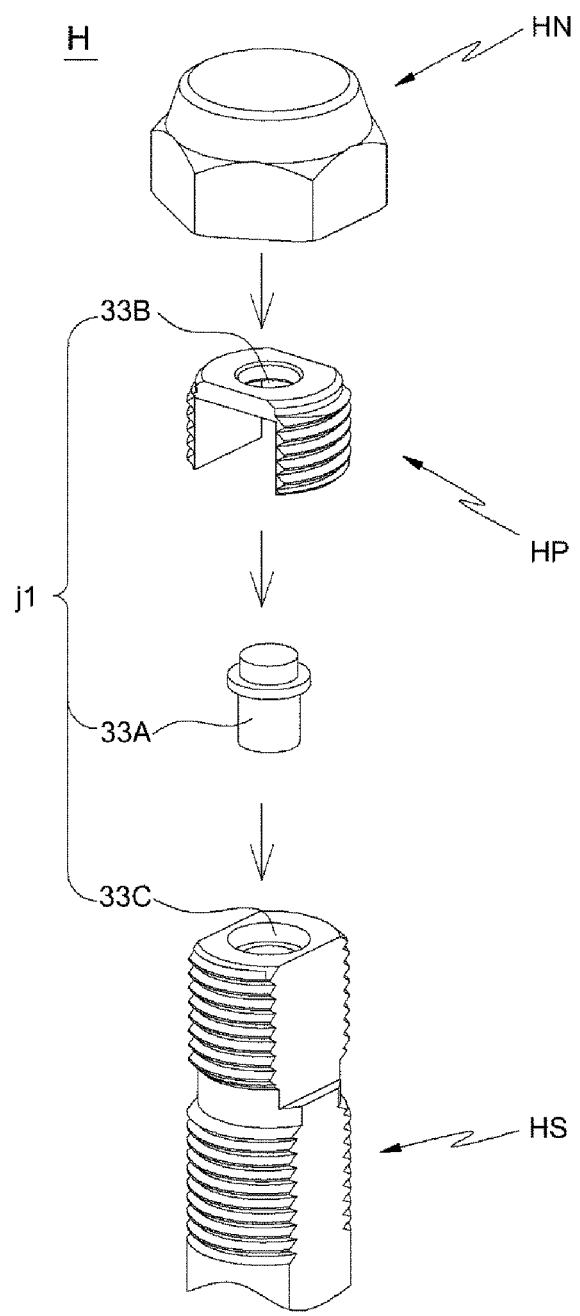

Further, the modified first male-female coupling mechanism j1 shown in FIG. 4A is composed of a coupling pin 33A that is a separate part, a female portion 33C that is a groove formed on the top of the handle shaft HS, and a female portion 33B that is a hole formed through the bridge 25 of the plug HP such that the upper portion and the lower portion divided by a flange of the coupling pin are fitted in the female portion 33B and the female portion 33C, respectively, and then the female threaded portion Hn of the handle nut HN is thread-fastened to the coupling male threaded portion.

Figure 4B:
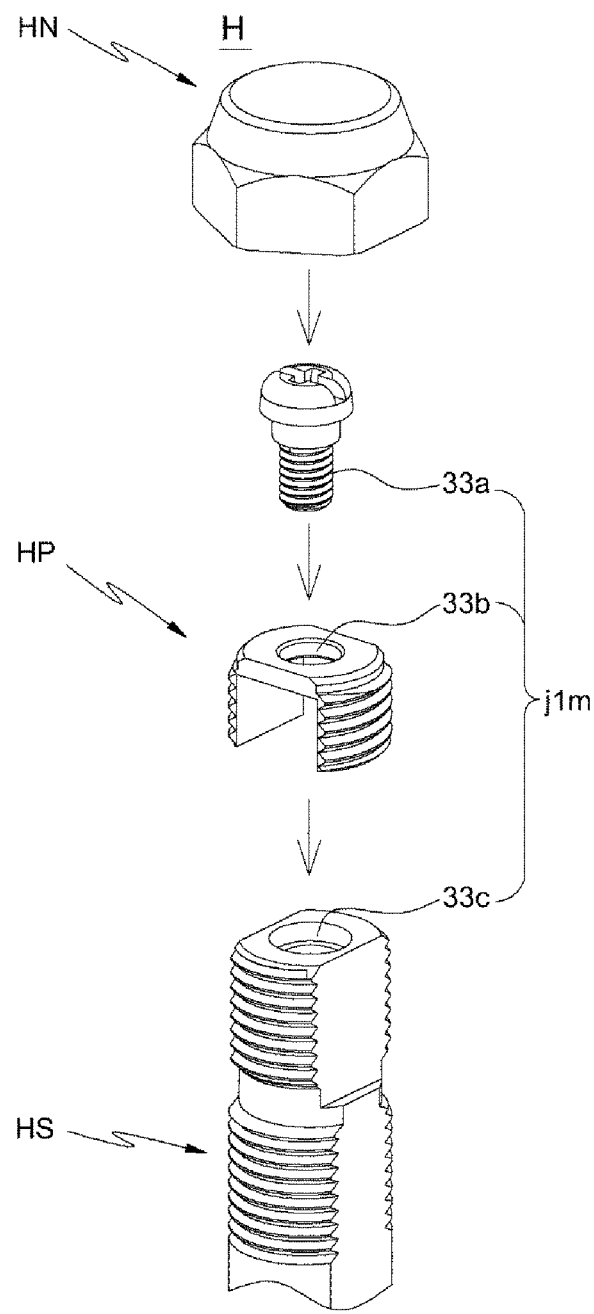

Further, another modified first male-female coupling mechanism j1m shown in FIG. 4B is composed of a coupling bolt 33a that is a separate part, a female portion 33b that is a hole formed through the bridge 25 of the plug HP, and a female portion 33c that is a threaded groove formed on the top of the handle shaft HS such that the coupling bolt is thread-fastened to the female portion 33c through the female portion 33b and then the female threaded portion Hn of the handle nut HN is thread-fastened to the coupling male threaded portion.

Meanwhile, as for the second male-female coupling mechanisms, the second male-female coupling mechanism J2 shown in FIG. 5A is composed of female portions 35B that are recessed rails formed on the first flat portions 13 at the upper end portion of the handle shaft HS and male portions 35A that are protruding rails on the inner sides of the filler portions 23 protruding downward from both sides of the bridge 25 of the plug HP.

The plug is combined with the handle shaft by sliding the male portions 35A into the female portions 35B and then the handle nut HN is thread-fastened to the coupling male threaded portion.

Further, the modified second male-female coupling mechanism J2m in FIG. 5B is composed of a female portion 35b that is a stopper with an opening formed at a predetermined distance from the first flat portions 13 and the first male threaded portions 11 over the top of the handle shaft HS and a male portion 35a that is the bridge 25 connecting both filler portions 23 of the plug HP such that the female portion 35a is slid into the female portion 35b and stopped by the side connected to the stopper and then the handle nut HN is thread-fastened to the coupling male threaded portion.

Although the configuration relating to the structure of common fishing reels and the operation of common handles well known in the art was not described above, those skilled in the art can easily estimate, infer, and implement the configuration.

Although a fishing reel and a handle which have specific shape and structure were described above with reference to the accompanying drawing, the present invention may be changed and modified in various ways by those skilled in the art and those changes and modifications should be construed as being included in the scope of the present invention.

What is claimed is:

1. A fishing reel comprising:
   a frame;
   a spool combined with the frame through a spool shaft;
   a handle coupled to a side of the frame through a handle shaft to rotate the spool; and
   a tension nut disposed on a side of the frame to adjust a casting distance by controlling a rotational speed of a spool shaft,
   wherein the handle includes:
   a handle shaft operating with the spool and having first male-threaded portions at an end thereof, anti-idling first flat portions formed at sides of the first male threaded portions, and stoppers formed at lower ends of the first flat portions;
   a handle arm having a coupling hole fitted on the first male threaded portions having a non-circular structure for preventing idling due to the first flat portions, to be seated on the stoppers;
   handle knobs disposed at ends of the handle arm;
   an anti-loosening plug fitted on the first flat portions of the handle shaft and having sub-male threaded portions corresponding to the first male threaded portions; and
   a handle nut thread-fastened to a coupling male threaded portion formed by the first male threaded portions and the sub-male threaded portions and fixing the handle arm locked to the stoppers.

2. The fishing reel of claim 1, wherein first flat portions of the handle shaft are symmetrically formed on both sides of an end portion of the handle shaft and have a U-shaped cross-section, and
   the plug has filler portions formed at both sides and having the sub-male threaded portions and a bridge connecting the filler portions.

3. The fishing reel of claim 1, wherein a positioning mechanism is disposed between the plug and the handle shaft,
   wherein the positioning mechanism is a first male-female coupling mechanism formed in a longitudinal direction of the handle shaft or a second male-female coupling mechanism formed across the longitudinal direction.

4. The fishing reel of claim 3, wherein the first male-female coupling mechanism is composed of a male portion protruding on a top of the handle shaft and a female portion that is a hole formed through the bridge of the plug, so the bridge is fitted on the male portion through the female portion and then the handle nut is thread-fastened to the coupling male threaded portion.

* * * * *